Dec. 26, 1933.    W. A. GRUSE ET AL    1,941,169
MAKING SYNTHETIC OIL
Filed Feb. 18, 1931
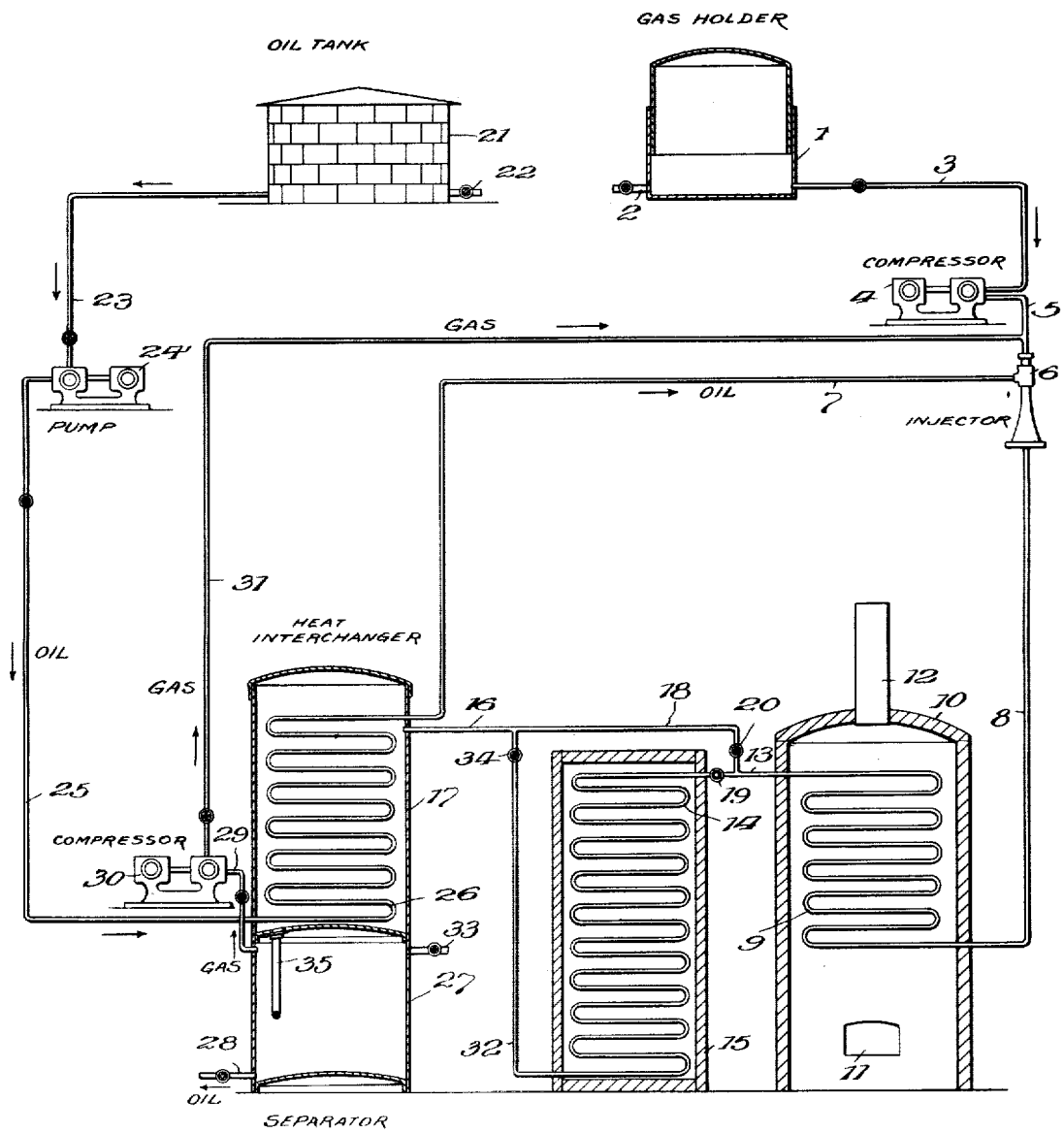
Inventor
K. P. McElroy
W. A. Gruse
By  A. M. Houghton.
    Attorney Patented Dec. 26, 1933

1,941,169

UNITED STATES PATENT OFFICE 1,941,169

MAKING SYNTHETIC OIL

William A. Gruse, Wilkinsburg, Pa., and Karl P. McElroy, Ox Road Crossing, Va., assignors to Gulf Refining Company, Pittsburgh, Pa., a corporation of Texas Application February 18, 1931. Serial No. 516,814

6 Claims. (Cl. 196—9)

This invention relates to making synthetic oils; and it comprises a process wherein a hydrocarbon oil having a high carbon:hydrogen ratio, that is, a ratio above 85.7:14.3, and a hydrocarbon gas having a low carbon:hydrogen ratio, that is, a ratio below 85.7:14.3 and usually being natural gas or methane are brought into admixture and contact at a high temperature and at a high pressure in such proportion as to give an average hydrogen content in the admixture of about 14.3 per cent and the admixture is heated to produce internal reactions and rearrangement, heating being in transit through a hot tube under such pressure, the reaction product being then cooled and the pressure released, cooling being usually in countercurrent between outflowing and inflowing oil; all as more fully hereinafter set forth and as claimed.

All high grade oils and waxes made in refining petroleum approximate a composition which may be represented as $C_nH_{2n}$; that is they contain carbon and hydrogen in a 6:1 ratio by weight. This corresponds to 85.7 per cent carbon and 14.3 per cent hydrogen. High grade products, and especially light oils, may contain a little less carbon, as in $C_nH_{2n+2}$ hydrocarbons; but not more carbon. On the other hand, crude petroleum oil rarely contains more than about 12 per cent hydrogen and the content may be as low as 10; particularly with asphalt-bearing crudes. In the routine of refinery work there is, so to speak, a partition of the carbon between the overhead distillates and residual oils. Crude oils and distillates are often submitted to a process which is called taking the carbon out; meaning that the oil is distilled under conditions giving a residue of coke. And in any cracking distillation there is the production of low grade oils, rich in carbon, which are useful mainly for fuel.

On the other hand, there are ample supplies of hydrocarbon gases in which the ratio of carbon is too low, as in natural gas containing methane in which the ratio of carbon to hydrogen is 6:2. Refinery hydrocarbon gases also average materially less carbon than corresponds to the desirable 6:1 ratio. These often contain considerable amounts of methane and its homologs, with carbon:hydrogen ratios lying between 6:1 and 5:1.

In the present invention hydrocarbon oils are synthesized, hydrocarbon gases being used as a reaction material; the hydrocarbon gas being heated with an oil rich in carbon under high pressure; the temperature being one at which molecular rearrangements will take place with production of dynamic equilibria. The pressure is of the order of 1000 pounds per square inch, or higher, and the temperature is around 500° to 550° C. or 932° to 1022° F. These temperatures, which are high cracking temperatures, are in a range at which the various hydrocarbon molecules become unstable and reactive, and under the high pressure conditions prevailing the tendency of the reactions is to go forward to relieve the pressure; or, in other words, to produce oils of high molecular weight at the expense of the hydrocarbon gases with the aid of the tarry hydrocarbon oil supplied. As will be seen, the net result is exactly the opposite of that in ordinary cracking processes wherein there is a production of a light volatile overhead and a heavy residual oil. Indeed the residual heavy oils from cracking operations are particularly useful in the present process furnishing a source of carbon to be added to the gas.

Since for a given weight heavy oils and their vapors occupy less space than light oils and their vapors, there is in the present process little enhancement of the ordinary tendency toward the production of gasoline. No "cracking" with the production of gasoline-like products takes place. Where gasoline is wanted, it is better to crack the synthetic oils produced in the present process by a cracking method conducted in the usual way and by the usual apparatus. Before cracking, the oil may be topped.

Whatever the particular oil and the particular gas used, they are employed in such relative proportions as will give an average carbon to hydrogen ratio of about 6:1. These are reacted under conditions producing internal rearrangements and equilibration. The carbon ratio can advantageously be a little less but should not be greater. In other words, the mixture entering the system should have an average composition of at least 85.7 per cent carbon and 14.3 per cent hydrogen. The percentage of hydrogen can be more, say 15 or 16 per cent, to obtain the desired effect in a shorter time; but if time be allowed for the hydrocarbons produced to rearrange to the more stable forms, the proportion first mentioned is sufficient.

The volume of tarry oil required to furnish the necessary carbon for natural gas is very little as compared with the volume of the gas, even at the pressure here used. And on spraying the oil into the hot gas the aerosol or dispersion at first formed soon gives a mixture which is, for the present purposes, substantially homogeneous and which can be passed through pipes and otherwise handled like a homogeneous fluid. Because of the carbon hydrogen ratio used there is no tendency to the deposition of coke, and, on the other hand, there is no tendency to abstract carbon from ordinary steel. Ordinary steel tubing can be used, special steels not being necessary. No particular catalyst is necessary for the present reactions, the metal of the tubing being sufficient. The reaction being one of contraction but little heat is required after the mixture is brought to temperature. All actions here desired can be, and advantageously are, performed in transit with the oil sprayed into the gas and the mixture sent forward through hot tubing. Application of heat is necessary toward the inlet end of the system in order to bring the commingled oil and gas to temperature. Whatever the length of the passage given for reactions, about the same pressure should prevail therethrough with merely the pressure differential necessary for flow. After passage through the hot conduit, the reaction products are cooled under the existing pressure to allow a separation of unchanged gas. This gas may be re-cycled, allowance being made for its volume and composition in making the mixture of oil and gas. There will be further separation of gas from the oil on relieving the pressure on it, and this gas may also be used by recycling it.

In the accompanying drawing we have shown partly in elevation and partly in section an apparatus useful in the performance of our process. In the drawing 1 indicates a gas holder to which the gas is supplied through valved inlet 2 and from which the gas is taken through valved pipe 3 to the inlet of the compressor 4. From the compressor the gas under 1000 pounds or more pressure is delivered by pipe 5 to the injector 6 where it is met by the oil from line 7. The mixture of oil and gas in the form of a spray is delivered by the injector through line 8 to the coil 9 in furnace 10 heated by oil burner, gas burner or the like at 11. 12 is the stack. We advantageously arrange the coil in the furnace so that the gaseous mixture is first delivered to the furnace at the lowest or hottest part thereof and discharged at the highest or relatively cooler part. The mixture passes from the coil 9 through pipe 13, and where the conditions are such that a relatively long time for reaction is desired the mixture can be sent through extension coil 14 in insulated chamber 15. The reaction tends to be exothermic after the materials are brought to the temperature of reaction and the heat can be maintained for a sufficient period of time by the coil just described. From the coil 14 the reaction products pass by line 32 to line 16 and thence to the heat interchanger 17 (to be described). When the reaction takes place in 9 to a sufficient extent the coil in chamber 15 may be by-passed, in which event the reaction products from the coil 9 in the furnace 10 are sent by lines 18 and 16 to the heat interchanger 17. The valves 19 and 20 on lines 13 and 18 are suitably adjusted to either send the mixture through the coil 14 or to by-pass that coil. Each valve can be cracked to an extent permitting the passage of some of the mixture through the coil 14 and some of the mixture directly to the heat interchanger 17.

The heat interchanger is used to preheat the oil which is delivered to the injector 6. Oil from tank 21 supplied through inlet 22 is delivered by means of pipe 23 to the pump 24 from which the oil is sent under pressure through line 25 to and through the coil 26 in the heat interchanger. From the coil 26 the oil heated by the reaction products from coil 14 or coil 9 of the furnace, as the case may be, is delivered by line 7 to the injector 6 as heretofore described. The reaction products from the coil 9 or the coil 14 enter the heat interchanger 17 and are cooled by the incoming oil in coil 26. The cooled products are then, under the pressure maintained, delivered to separator 27, preferably tangentially, as by pipe 35, in order to establish a whirling motion in such separator and to facilitate gravital separation of liquid and gas with settling of the liquid reaction product in the separator, whence it is drawn by means of valved line 28 from a low point thereof. The synthetic oil so produced is found to have a carbon content very close to that desired, namely 85.7 per cent. The gas which separates is taken by line 29 to a step-up compressor 30 and is delivered from such compressor by means of line 31 to line 5 on the outlet side of the compressor 4, joining the gas from such compressor on its way to the injector 6 where the oil from line 7 is picked up. The compressor 30 should be operated to step-up the pressure so that it is equivalent to that of the gas leaving compressor 4. Gas can be removed from separator 27 by outlet 33 and scrubbed and stored for return to the system or for other use.

Pressures of the orders of two thousand and three thousand pounds per square inch are advantageous in our process.

What we claim is:

1. A process of making synthetic oil which comprises atomizing a liquid hydrocarbon characterized by more than 85.7 per cent by weight of carbon in its constitution into a hydrocarbon gas characterized by less than 85.7 per cent by weight of carbon in its constitution, the mixture being so proportioned as to have a constituent carbon content of less than 85.7 per cent of its weight; passing this mixture in a stream, under a pressure of the order of 1000 pounds, through a tube, and heating it in its passage therethrough to a temperature of the order of 500° to 550° C.; maintaining the heated mixture at its elevated temperature for a period sufficient to permit rearrangement and recombining of the atoms in the oil and gas molecules without deposition cf carbon and with the resultant production of an oil characterized by a less proportion of constituent carbon than that oil used in making the mixture to be treated; and cooling the heated stream, thereby condensing out the resultant liquid oil.

2. A continuous process of making synthetic oil which comprises atomizing a liquid hydrocarbon characterized by more than 85.7 per cent by weight of carbon in its constitution into a hydrocarbon gas characterized by less than 85.7 per cent by weight of carbon in its constitution, the mixture being so proportioned as to have a constituent carbon content of less than 85.7 per cent of its weight; passing this mixture in a stream, under a pressure of the order of 1000 pounds, through a tube, and heating it in its passage therethrough to a temperature of the order of 500° to 550° C.; maintaining the heated mixture at its elevated temperature for a period sufficient to permit rearrangement and recombining of the atoms in the oil and gas molecules with the resultant production of an oil characterized by a less proportion of constituent carbon than that oil used in making the mixture to be treated; cooling the heated stream, thereby condensing out the resultant liquid oil; and returning the uncondensed portion of the so-treated stream to the beginning of the system to constitute in part the hydrocarbon gas entering into the mixture to be treated.

3. A continuous process of making synthetic oil which comprises atomizing a liquid hydrocarbon characterized by more than 85.7 per cent by weight of carbon in its constitution into a hydrocarbon gas characterized by less than 85.7 per cent by weight of carbon in its constitution, the mixture being so proportioned as to have a constituent carbon content of less than 85.7 per cent of its weight; passing this mixture in a stream, under a pressure of the order of 1000 pounds, through a tube, and heating it in its passage therethrough to a temperature of the order of 500° to 550° C.; maintaining the heated mixture at its elevated temperature for a period sufficient to permit rearrangement and recombining of the atoms in the oil and gas molecules with the resultant production of an oil characterized by a less proportion of constituent carbon than that oil used in making the mixture to be treated; cooling the heated stream, thereby condensing out the resultant liquid oil; and effecting part of the cooling by passing the relatively cool fresh oil to be treated in heat transfer relationship with the hot treated mixture.

4. In the production of synthetic oils, the process which comprises atomizing a residual oil from a cracking process into an atmosphere of natural gas in such proportion that the carbon content of the mixture shall be somewhat less than 85.7 per cent by weight, passing said mixture through a constricted reaction zone at temperatures of the order of 500° to 550° C. and at pressures between 1000 and 3000 pounds per square inch, and condensing the resulting synthetic oil at substantially the same pressures.

5. In the production of synthetic oils, the process which comprises equilibrating two hydrocarbons by heating a mixture thereof at temperatures within the range 500° to 550° C. and under pressures of from 1000 to 3000 pounds; one of said hydrocarbons being a gas at ordinary temperatures containing a carbon content less than 85.7 per cent and the other hydrocarbon being an oil containing a carbon content greater than 85.7 per cent, the said two hydrocarbons being introduced into the process in such ratio that the average carbon content of the mixture is somewhat less than 85.7 per cent.

6. In the production of synthetic oils, the process which comprises intimately mixing a liquid hydrocarbon characterized by containing more than 85.7 per cent by weight of carbon in its constitution, with a second hydrocarbon characterized by being a gas at ordinary temperatures and containing less than 85.7 per cent by weight of carbon in its constitution, the mixture being so proportioned as to have a constituent carbon content of less than 85.7 per cent of its weight; heating the said mixture in a constricted heating zone under a pressure ranging from about 1000 to 3000 pounds and at temperatures of the order of 500° to 550° C.; maintaining the heated mixture at its elevated temperature for a period sufficient to permit equilibration of the said two hydrocarbons with the resultant production of a synthetic oil characterized by a less proportion of constituent carbon than said liquid hydrocarbon used in making the mixture; cooling the reaction products thereby condensing out the resultant liquid oil; and recycling the uncondensed portion of the reaction products to the first step of the process.

WILLIAM A. GRUSE.
KARL P. McELROY.

CERTIFICATE OF CORRECTION.

Patent No. 1,941,169. December 26, 1933.

WILLIAM A. GRUSE, ET AL.

It is hereby certified that error appears in the printed specification of the above numbered patent requiring correction as follows: Page 1, line 87, after "particular" second occurrence, insert hydrocarbon; and line 88, after "in" insert the words admixture and in; and that the said Letters Patent should be read with these corrections therein that the same may conform to the record of the case in the Patent Office.

Signed and sealed this 23rd day of January, A. D. 1934.

F. M. Hopkins (Seal) Acting Commissioner of Patents.

out the resultant liquid oil; and returning the uncondensed portion of the so-treated stream to the beginning of the system to constitute in part the hydrocarbon gas entering into the mixture to be treated.

3. A continuous process of making synthetic oil which comprises atomizing a liquid hydrocarbon characterized by more than 85.7 per cent by weight of carbon in its constitution into a hydrocarbon gas characterized by less than 85.7 per cent by weight of carbon in its constitution, the mixture being so proportioned as to have a constituent carbon content of less than 85.7 per cent of its weight; passing this mixture in a stream, under a pressure of the order of 1000 pounds, through a tube, and heating it in its passage therethrough to a temperature of the order of 500° to 550° C.; maintaining the heated mixture at its elevated temperature for a period sufficient to permit rearrangement and recombining of the atoms in the oil and gas molecules with the resultant production of an oil characterized by a less proportion of constituent carbon than that oil used in making the mixture to be treated; cooling the heated stream, thereby condensing out the resultant liquid oil; and effecting part of the cooling by passing the relatively cool fresh oil to be treated in heat transfer relationship with the hot treated mixture.

4. In the production of synthetic oils, the process which comprises atomizing a residual oil from a cracking process into an atmosphere of natural gas in such proportion that the carbon content of the mixture shall be somewhat less than 85.7 per cent by weight, passing said mixture through a constricted reaction zone at temperatures of the order of 500° to 550° C. and at pressures between 1000 and 3000 pounds per square inch, and condensing the resulting synthetic oil at substantially the same pressures.

5. In the production of synthetic oils, the process which comprises equilibrating two hydrocarbons by heating a mixture thereof at temperatures within the range 500° to 550° C. and under pressures of from 1000 to 3000 pounds; one of said hydrocarbons being a gas at ordinary temperatures containing a carbon content less than 85.7 per cent and the other hydrocarbon being an oil containing a carbon content greater than 85.7 per cent, the said two hydrocarbons being introduced into the process in such ratio that the average carbon content of the mixture is somewhat less than 85.7 per cent.

6. In the production of synthetic oils, the process which comprises intimately mixing a liquid hydrocarbon characterized by containing more than 85.7 per cent by weight of carbon in its constitution, with a second hydrocarbon characterized by being a gas at ordinary temperatures and containing less than 85.7 per cent by weight of carbon in its constitution, the mixture being so proportioned as to have a constituent carbon content of less than 85.7 per cent of its weight; heating the said mixture in a constricted heating zone under a pressure ranging from about 1000 to 3000 pounds and at temperatures of the order of 500° to 550° C.; maintaining the heated mixture at its elevated temperature for a period sufficient to permit equilibration of the said two hydrocarbons with the resultant production of a synthetic oil characterized by a less proportion of constituent carbon than said liquid hydrocarbon used in making the mixture; cooling the reaction products thereby condensing out the resultant liquid oil; and recycling the uncondensed portion of the reaction products to the first step of the process.

WILLIAM A. GRUSE.
KARL P. McELROY.

CERTIFICATE OF CORRECTION.

Patent No. 1,941,169.   December 26, 1933.

WILLIAM A. GRUSE, ET AL.

It is hereby certified that error appears in the printed specification of the above numbered patent requiring correction as follows: Page 1, line 87, after "particular" second occurrence, insert hydrocarbon; and line 88, after "in" insert the words admixture and in; and that the said Letters Patent should be read with these corrections therein that the same may conform to the record of the case in the Patent Office.

Signed and sealed this 23rd day of January, A. D. 1934.

F. M. Hopkins (Seal)   Acting Commissioner of Patents.